Dec. 3, 1968 L. A. BIXBY 3,413,873
MULTI-SPEED PLANETARY DRIVE AXLE ASSEMBLY
Filed May 8, 1967 4 Sheets-Sheet 1

INVENTOR
LEO A. BIXBY

BY *Strauch, Nolan, Neale,*
*Nies & Kurz*
ATTORNEYS

Dec. 3, 1968    L. A. BIXBY    3,413,873
MULTI-SPEED PLANETARY DRIVE AXLE ASSEMBLY
Filed May 8, 1967    4 Sheets-Sheet 4

INVENTOR
LEO A. BIXBY

BY Strauch, Nolan, Neale,
Nies & Kurz
ATTORNEYS 3,413,873
MULTI-SPEED PLANETARY DRIVE
AXLE ASSEMBLY
Leo A. Bixby, Niles, Mich., assignor, by mesne assignments, to Rockwell-Standard Company, Pittsburgh, Pa., a corporation of Delaware
Filed May 8, 1967, Ser. No. 636,807
10 Claims. (Cl. 74—695)

ABSTRACT OF THE DISCLOSURE

A two speed planetary gear drive axle assembly comprises a carrier fixed over and extending within a drive axle housing and having spaced arms within the housing rotatably mounting a differential housing connected by the usual bevel pinion and ring gear to the engine driven propellor shaft. The housing contains differential mechanism connected between the usual drive axle shafts. The differential cage constitutes a carrier for planet gears constantly meshed with an internal ring gear fixed on the differential housing and an axially slidable sun gear sleeve that projects through one end of the differential housing. The sun gear is shiftable between one operative position where it is clutched to a stationary stop ring rigid with the axle carrier and a second operative position where it is clutched to the differential cage. The stop ring is secured on the carrier arm adjacent the sun gear sleeve and independently of the adjustment nut for the bearings mounting the differential housing, so that drive torque reactions do not affect the bearing adjustment. In one embodiment the stop ring is fixed to the carrier arm and the associated bearing cap that completes the bearing mount, and in other embodiments the stop ring is secured only upon the bearing cap. The hitherto conventional internal wear plate between adjacent axial surfaces of the differential cage and differential housing is eliminated because special lubricant passages through the cage supply lubricant from the differential space to those surfaces.

BACKGROUND OF INVENTION

(a) Field of invention

The invention relates to a two speed planetary gear drive mechanism wherein a slidable sun gear in one selected speed position is locked against rotation by clutching it to a stationary stop mounted on a carrier structure rigid with the drive axle housing, this being effected by an arrangement that requires no modification of the axle housing and that does not adversely affect the differential bearing adjustment. The invention also provides special internal lubrication arrangements in such mechanism.

(b) Prior art

U.S. Letters Patent to Starr No. 2,178,900 illustrates a hitherto conventional two speed planetary drive axle of this type wherein the sun gear when shifted to be locked against rotation is clutched to the annular adjustment nut for the bearing mounting differential housing, and transmission of drive torque reaction forces through the sun gear has been found to adversely affect the bearing adjustment. It has been proposed to clutch the sun gear directly to the axle housing by modifying the axle housing structure and attaching a special locking ring to clutch with the sun gear independently of the bearing adjustment, as disclosed in U.S. Letters Patent to Stump No. 3,031,900 but this requires modification of the axle housing and provision of an added part to be mounted on the axle housing. In all known practical axle assemblies of this type an internal axial wear plate is considered necessary between the differential housing and the end of the differential end cage which carries the planet gears as shown in the Starr patent.

SUMMARY OF INVENTION

The invention provides a two speed planetary gear drive axle wherein the differential and planetary gear mechanisms are mounted within a differential housing rotatably supported by bearings in spaced arms of a carrier structure secured to the drive axle housing and wherein the sun gear is an axially slidable sleeve that projects through one arm of the carrier structure to which it may be non-rotatably locked by clutching to a special stop ring mounted on that arm. The invention also provides novel internal lubricant distribution for reduced wear and improved operation.

It is a major object of the invention to provide novel mounting of the stationary lock ring remote from and divorced from the differential bearing adjusting nut so that drive torque reaction forces will not be applied to the bearing adjusting nut when the sun gear is locked against rotation but instead the reaction forces will be taken by the carrier structure and/or the bearing cap thereon. This provides a great mechanical and economical advantage since it effectively prolongs the life of the bearing because the proper preload is maintained by protection of the adjustment.

A further object of the invention is to provide a novel system of lubrication within a drive axle assembly of this type wherein lubricant passage means is provided through the planet gear carrier for introduction of lubricant between the axially adjacent internal surfaces of the differential housing and the differential cage which may be subject to thrust and relative rotation during normal operation, thereby eliminating the usual wear plate at this location.

Further objects will become apparent from the description of the invention in its preferred embodiments, and the claims.

PREFERRED EMBODIMENTS OF INVENTION

Figure 1:
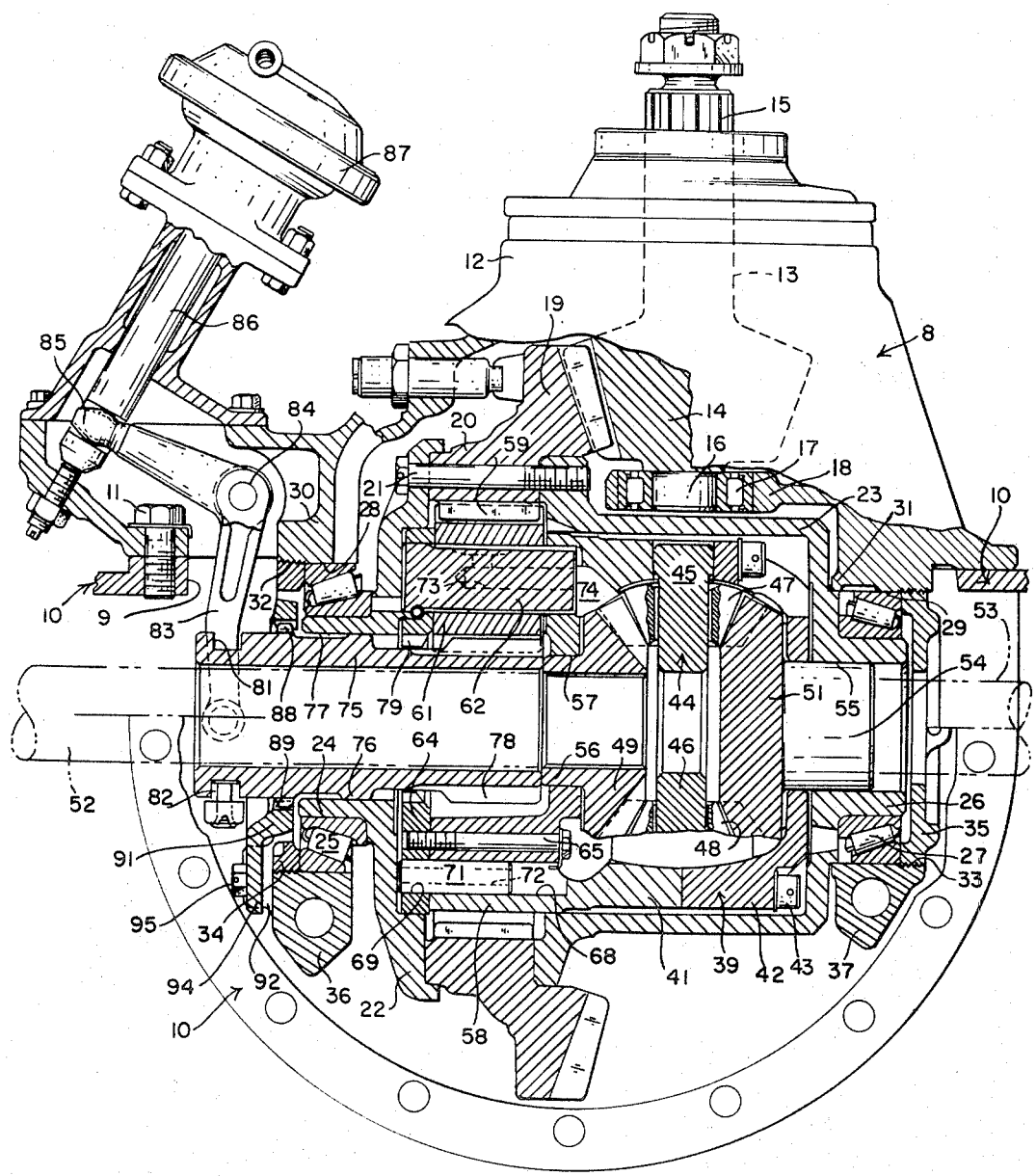
FIGURE 1 is a plan view partly cut away and sectioned showing a two speed planetary drive gear arrangement for a vehicle drive axle according to a preferred embodiment of the invention.

FIGURE 1 shows the differential carrier 8 of a vehicle drive axle housing, with planetary two speed drive mechanism incorporated therein. The carrier itself is of generally conventional structure and it is mounted to extend over the front opening 9 of axle housing 10 to which it is secured by bolts 11. Carrier 8 has a reduced forwardly extending neck portion 12 having suitably rotatably mounted therein an input pinion shaft 13 formed with an integral bevel pinion 14. The projecting splined end 15 of shaft 13 is adapted for connection to the usual universal joint and propeller shaft assembly (not shown) driven by the vehicle engine.

The inner end 16 of shaft 13 is mounted by antifriction bearings 17 in an internally projecting integral housing member 18, so that a straddle mount is provided for effective alignment retaining support of the pinion shaft.

Pinion 14 is constantly meshed with a bevel ring gear 19. Gear 19 has a body 20 axially clamped, as by bolt assemblies 21, between the opposite end members 22 and 23 of a differential housing. As will appear gear body 20 and housing end members 22 and 23 cooperate to define a housing closure for the differential mechanism and the planetary gearing within the drive axle in the invention.

The differential housing is mounted for rotation about an axis perpendicular to the plane containing the axis of pinion shaft 13, being supported at opposite ends by boss 24 of housing member 22 extending into the tapered roller bearing assembly 25, and boss 26 of housing member 23 extending into the tapered roller bearing assembly 27. Bearing assemblies 25 and 27 are coaxially mounted in aligned relation in bores 28 and 29 respectively of integral inwardly projecting generally parallel carrier arms 30 and 31. The outer ends of these bores are threaded at 32 and 33 to receive annular bearing adjustment and retainer nuts 34 and 35 that when properly tightened locate and preload the bearings.

Figure 2:
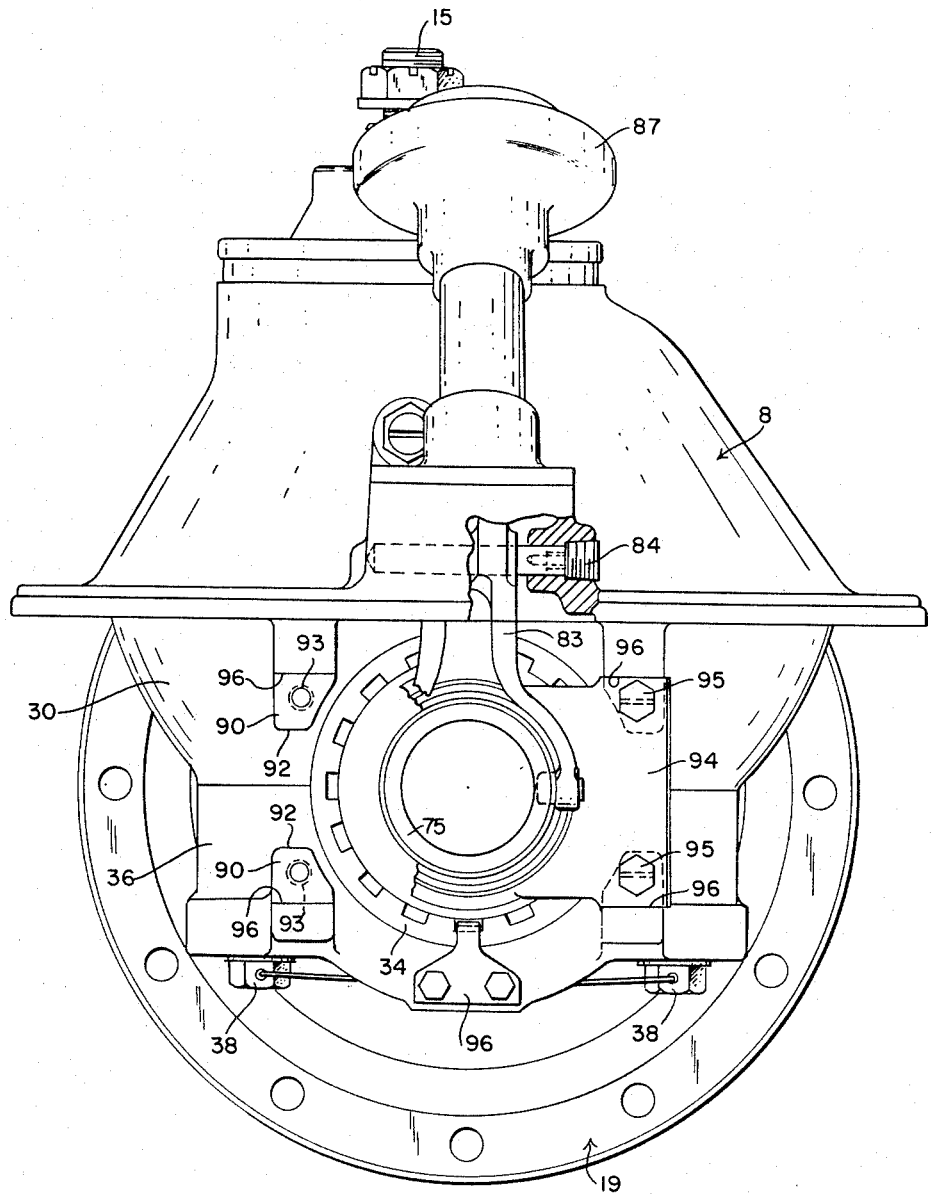
FIGURE 2 is a side elevation of the drive axle arrangement of FIGURE 1 partially broken away and sectioned and showing further details.

Bores 28 and 29 are cylindrical, the upper halves being formed directly in arms 30 and 31 and the lower halves being formed in separable bearing caps 36 and 37 secured upon the undersides of the arms. FIGURE 2 shows cap 36 secured upon arm 30 by bolts 38, and cap 37 is similarly secured on arm 31. Effectively caps 36 and 37 are parts of the carrier arms when bolted in place and they hold the bearing assemblies on the arms.

One portion of the differential housing surrounds a differential gear support in the form of a cage 39 comprising opposed sides 41 and 42 secured together by bolt assemblies 43 to clamp a cross member 44 between them. Two arms 45 and 46 of the cross arm member are shown rotatably mounting differential pinions indicated at 47 and 48. All four pinions are meshed with differential side gears 49 and 51 fixed to oppositely extending axle drive shafts 52 and 53, respectively. Shafts 52 and 53 transmit power to the road engaging wheels (not shown).

The hub 54 of gear 51 is journalled in bore 55 of housing member boss 26, and the hub 56 of gear 49 is journalled coaxially in a bore 57 formed in the differential cage.

As shown in FIGURE 1, differential cage end member 41 has an integral projecting end section 58 serving as a carrier for the planetary gearing to be described. Gear 19 is formed with a row of internal teeth 59 whereby it serves as the planetary ring gear, and gear 59 is meshed with a plurality of planet gears 61 that are freely rotatably mounted on planet shafts 62 fixed in carrier 58. Shafts 62 extend into apertures 63 in a carrier end plate 64 that are freely rotatably mounted on planet shafts 62 fixed in carrier 58. Shafts 62 extend into apertures 63 in a carrier end plate 64 that is secured to carrier 58 by studs 65. Shafts 62 are locked against rotation on the carrier by fasteners 66 extending into recesses 67 (see FIGURE 3). Carrier 58 is also formed with one or more axially through bores 68 aligned with bores 69 in the end plate for receiving dowel pins 71 having through central lubricant conducting passages 72, and each shaft 62 has a lubricant conducting bore 73 opening into the space 74 within the differential cage and leading to the bearing surfaces in the planet gears.

A hollow sleeve 75 surrounds axle shaft 52 in free spaced relation and is formed with raised portions 76 slidably guiding it within the bore 77 of housing end boss 24. At its inner end sleeve 75 is formed with a circular row of teeth 78 forming a sun gear slidably meshed with all of the planet gears 61. Carrier end plate 64 is formed with an internal row of teeth 79 that as will appear are adapted to coact as clutch teeth with the sun gear teeth to lock sleeve 75 non-rotatably in relation to the differential carrier in one axial position of sleeve 75.

Where it projects out of the carrier, sleeve 75 is formed with an annular groove 81 receiving a yoke 82 on the end of a bell crank lever 83 pivoted to the carrier at 84 and operatively connected at 85 to the reciprocable plunger or like shaft 86 of a shift actuating unit 87.

Externally of the differential housing, sleeve 85 is formed with a row of clutch teeth 88 that in the FIGURE 1 position are meshed with a coacting row of internal clutch teeth 89 on a stop ring 91 which is secured to the carrier independently of bearing adjustment nut 34.

As shown in FIGURE 2 the outer side of the carrier adjacent sleeve 75 is formed with four surface bosses 92, the lower two being formed on bearing cap 36, and these bosses all have flat faces 90 lying in a vertical plane and threaded bores 93. Stop ring 91 is integral with a plate 94 which at opposite corners is attached to the carrier at bosses 92 by bolts 95 extending into bores 93. Also as shown in FIGURE 2, a retainer 96 engages nut 34 and holds the adjustment.

Plate 94 is formed with a laterally displaced integral annular section that provides stop ring 91 and projects into the space surrounded by adjustment ring 34 but in free spaced relation thereto. Thus ring 34 is not subjected to torque reaction forces incident to meshing of the sun gear bearing sleeve with stationary stop ring 91.

Each boss 92 is also formed with a planar face 96 at right angles to face 90. These faces 96 are parallel and are located to engage the opposite flat edges of plate 94 at the corners, so that when plate 94 has been secured to the carrier arm these faces 96 cooperate to resist any turning of the plate relative to the carrier.

In operation unit 87 is actuated to axially shift sleeve 75 between the illustrated FIGURE 1 position where clutch teeth 88 and 89 are meshed so that the sleeve is locked against rotation with respect to carrier 8 and drive transmitted through the pinion 14 and ring gear 19 rotates the differential cage and the idling planet gears 61 around the sun gear for low speed drive of the axle shafts, and an axially displaced position to the left in FIGURE 1 where sleeve 75 is declutched from carrier 8 and is non-rotatably connected to the differential cage by sun gear teeth 78 being engaged with teeth 79 for high speed drive of the axle shafts.

Figure 3:
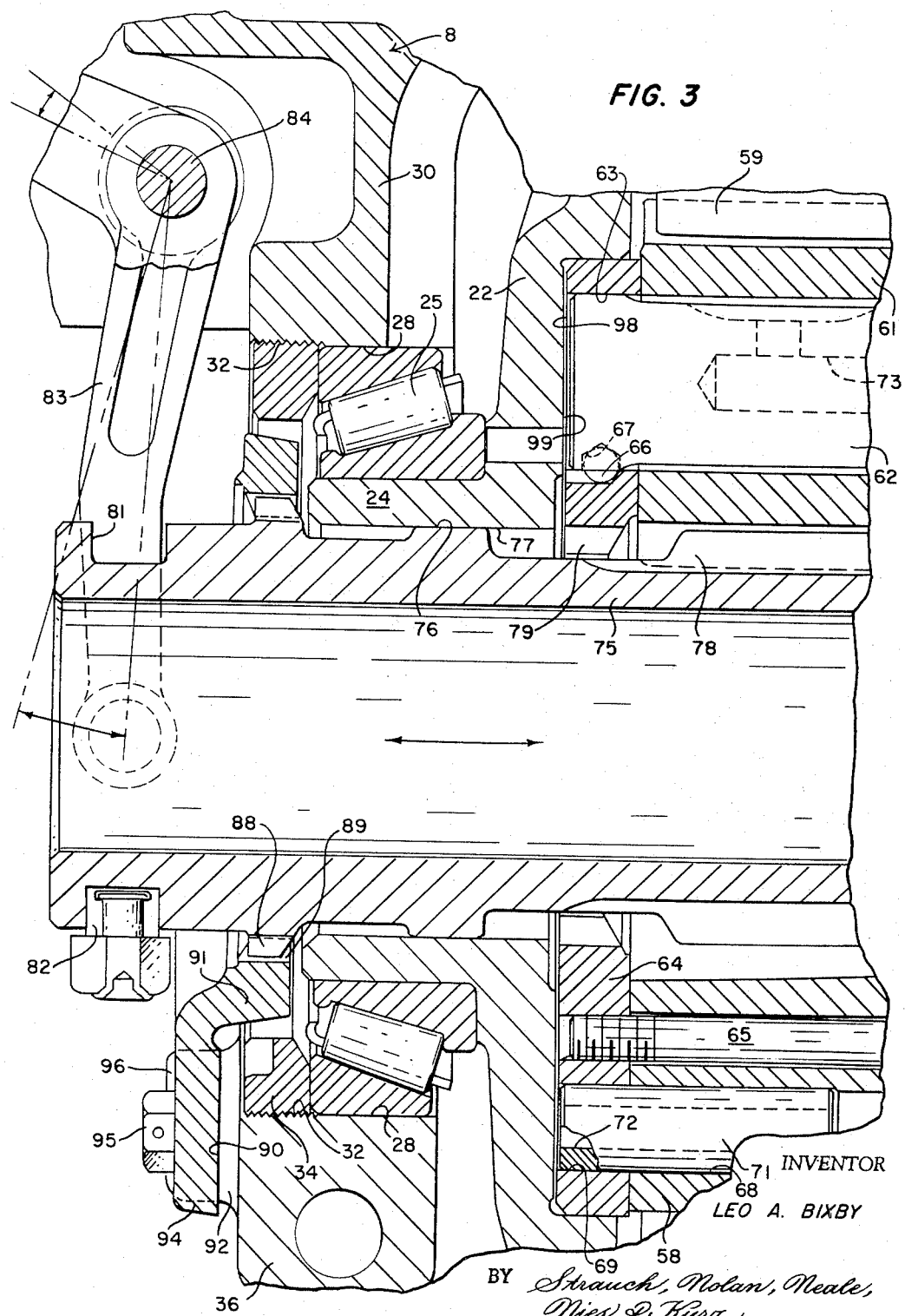
FIGURE 3 is an enlarged sectional view showing part of the mechanism, particularly the mounting of the stop ring independently of the bearing adjustment ring.

Referring to FIGURE 3, it will be seen that the outer end surface 98 of the differential cage is disposed closely adjacent the inner radial surface 99 of the differential housing. Normaly there is a small space between these surfaces which under certain conditions of operation rotate relative to each other and, depending on tolerances, may come into contact. Prior to the invention it was considered necessary as a practical matter to provide a wear plate in this space, and the need for this plate is eliminated in the invention.

It has been the practice in conventional planetary two speed axle drives of this type to secure the planetary carrier end plate to the carrier proper by dowels to locate the clutch teeth on the plate properly in relation to the related sun gear teeth. Due to the torque reaction forces and thrust loads set up when these teeth engage there is a tendency to drive the carrier end plate into frictional contact with the adjacent inner surface of the differential housing. To reduce this effect it has been proposed to install washers or wear plates between these surfaces, but this did not entirely solve the problem because the surfaces were not adequately lubricated.

In the invention carrier end plate 64 is solidly bolted to the pinion carrier so that upon engagement of teeth 79 with teeth 78 of the sun gear the end plate will not be shifted against the surface of the differential housing.

To assure sufficient lubrication at the adjoining surfaces 98 and 99 the end plate 64 is located on the carrier by one or more hollow dowels 71 that provide continuous communication from the interior of the differential housing to the space between surfaces 98 and 99. No wear plates are needed.

Figure 4:
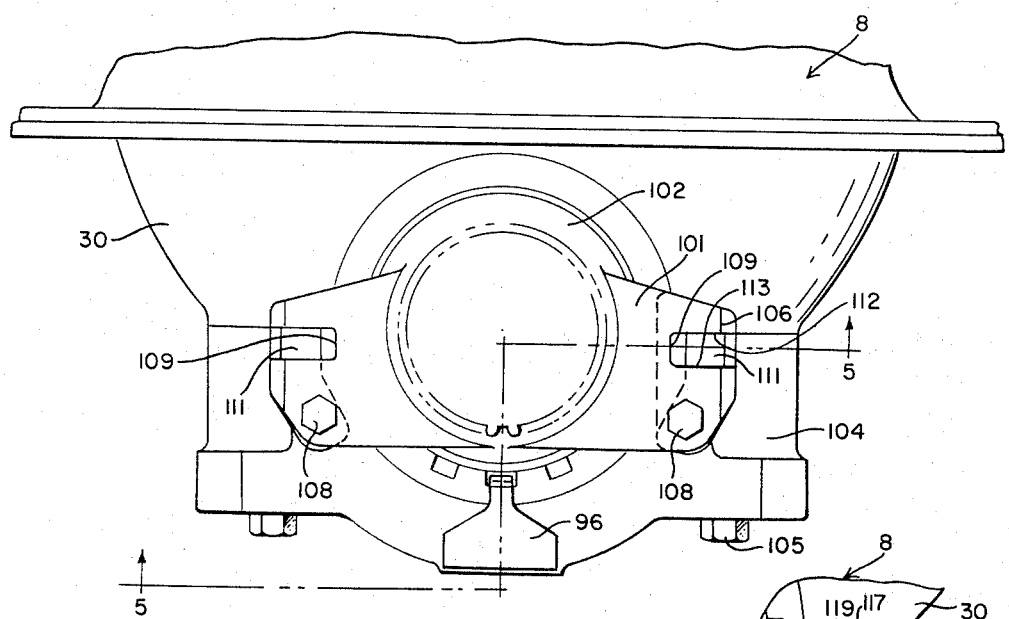
FIGURE 4 is a side elevation showing mounting of the stop ring only on the bearing cap.
Figure 5:
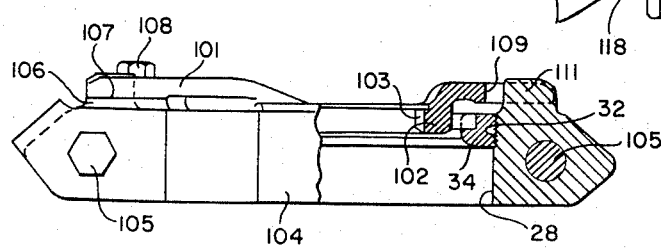
FIGURE 5 is a rear view partly broken away and in section showing details generally on line 5—5 of FIGURE 4.

FIGURES 4 and 5 illustrate an embodiment of the invention where the plate 101, carrying the laterally offset integral stop ring 102 having the clutch teeth 103 adapted to be engaged by teeth 88 of the sun gear sleeve for locking the sun gear against rotation, is mounted only on the bearing cap 104 which is secured upon the lower end of carrier arm 30 by bolts 105. Arm 30 is the same as shown in FIGURE 2 except that it has no plate mounting bosses, and it is formed with the upper halves of cylindrical bore 28 and threaded bore section 32. Cap 104 is formed with the lower halves of bore 28 and threaded section 32 as indicated in FIGURE 5.

Cap 104 is formed with two bosses 106 having flat coplanar faces 107 in which there are open threaded bores to receive plate attachment bolts 108. Plate 101 is formed with end recesses 109 into which extend snugly fitting integral projections 111 on cap 104. When bolts 108 are drawn tight, with projections 111 extending into recesses 109, stop ring 102 becomes rigid with the carrier arm. The matching contacting side faces 112 and 113 of the recesses and projections are machined parallel and sized for accurate interfit to correctly locate the stop ring in assembly.

Figure 6:
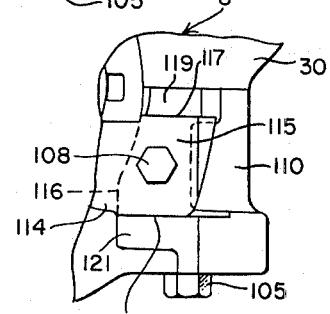
FIGURES 6 and 7 are fragmentary views showing two other optional mounting arrangements for the stop ring plate.

FIGURE 6 is a fragmentary view showing another manner of securing the lock ring plate on the bearing cap 110. Here the plate 114 is formed with the toothed stop ring as in FIGURES 4 and 5, but the opposite ends of the plate are flanges 115 seated on flat faced bearing cap bosses 116 and having opposite flat sides 117 and 118 snugly interfitting between the inner flat machined parallel surfaces of lugs 119 and 121 integral with the bearing cap. Bolts 108 secure the plate to the cap.

Figure 7:
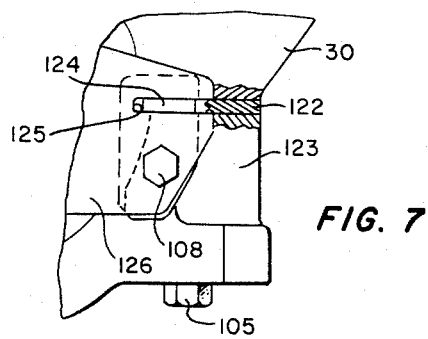

FIGURE 7 shows still another manner of mounting the lock ring plate on the bearing cap. Bearing cap spacer members 122 carry projections 124 fitting into the edge recesses 125 of a plate 126 that integrally carries a stop ring like that at 102 in FIGURE 5. The contacting surfaces of the projections and recesses are machined parallel and accurately interfit.

In all embodiments of the invention the inward offset of the stop ring locates the stationary clutch teeth for cooperation with standard sun gear structures, so that no modification of conventional sun gears is needed and the invention may be applied readily to repairs and replacements in the field.

In all of the embodiments of FIGURES 4-7, no modification of the standard carrier are required, as only the bearing cap is modified as compared to conventional structure. The foregoing adapts the invention to current production as well as field replacement with a minimum of change and required skill. No form of the invention requires modification of the drive axle housing or provision of parts that must be secured upon that housing in assembly.

The present invention may be embodied in other forms without departing from the spirit and essential characteristic thereof, therefore, the present embodiments are to be considered illustrative only and not restrictive, the scope of the invention being indicated by the appended claims rather than by the foregoing description.

I claim:
1. In a multispeed drive axle assembly of the type comprising an axle housing having an opening, a differential carrier extending over said opening and removably secured to said axle housing, said carrier having spaced arms projecting within said axle housing and containing bearing assemblies by which a differential mechanism enclosing housing is rotatably mounted, adjustment means on each of said arms for said bearing assemblies, said differential mechanism interconnecting oppositely extending drive axle shafts and including a gear support rotatably mounted within said differential housing, and a plurality of planet gears rotatably mounted on said gear support constantly meshed with an internal ring gear rigid with said differential housing and also constantly meshed with an axially slidable sun gear that extends out of said differential housing through one of said carrier arms, said sun gear having a set of teeth adapted to mesh with clutch teeth on said gear support in one axially disposed position and another set of teeth adapted to mesh with other clutch teeth on said carrier structure in another axially disposed position; the improvement that comprises means mounting a stop ring carrying said other clutch teeth on said one carrier arm independently of the bearing adjustment means on that arm.

2. In the drive axle assembly defined in claim 1, said stop ring being integral with a rigid plate and said mounting means comprising a plurality of spaced formations on said one carrier arm having interfitting connection with said plate.

3. In the drive axle assembly defined in claim 2, said plate and said formations having engaged abutting surfaces that resist rotation of the plate about the axis of said sun gear.

4. In the drive axle assembly defined in claim 1, said mounting means comprising a plurality of flat surfaced bosses on said one carrier arm, said stop ring comprising a rigid plate, and means detachably securing said plate upon said bosses.

5. In the drive axle assembly defined in claim 1, said mounting means comprising interfitting projection and recess means on the stop ring and said one carrier arm.

6. In the drive axle assembly defined in claim 1, said bearing adjustment means being annular nuts threaded into said arms, and stop ring comprising a plate secured on the outer side of said one carrier arm outwardly of the associated nut and formed with an offset annular toothed clutch portion surrounded by said associated nut in the assembly.

7. In the drive axle assembly defined in claim 1, the outer end of said one carrier arm comprising a detachable bearing cap for the associated bearing assembly, and said stop ring being mounted partly on said cap and partly on the inner end of said arm.

8. In the drive axle assembly defined in claim 1, the outer end of said one carrier arm comprising a detachable bearing cap for the associated bearing assembly and said stop ring being wholly mounted on said cap.

9. In the drive axle assembly defined in claim 6, said plate and said one carrier arm having coacting flat sided projections and recesses for resisting turning of said plate on the carrier arm.

10. In a multispeed drive axle assembly of the type having a carrier structure projecting within a drive axle housing and containing bearing assemblies by which a differential mechanism enclosing housing is rotatably mounted, said differential mechanism interconnecting oppositely extending drive axle shafts and including a differential cage rotatably mounted within said differential housing, an annular end plate detachably secured on said cage and formed with a row of internal clutch teeth, the outer side surface of said end plate and the axial inner surface of said differential housing extending in substantially parallel closely spaced relation, and a plurality of planet gears rotatably mounted on said cage constantly meshed with an internal ring gear rigid with said differential housing and also constantly meshed with an axially slidable sun gear that extends through said end plate and out of said differential housing through the carrier structure, said sun gear having a set of teeth adapted to mesh with clutch teeth on said end plate in one axially disposed position and another set of teeth adapted to mesh with other clutch teeth on said carrier structure in another axially disposed position; the improvement that comprises a dowel pin interconnecting said end plate and cage for properly locating the clutch teeth thereon relative to the sun gear, and means defining a lubricant conducting passage through said cage and said dowel pin for connecting the interior of said cage with the space between said closely adjacent end plate and differential housing surfaces.

References Cited

UNITED STATES PATENTS

| | | | |
|---|---|---|---|
| 2,426,593 | 9/1947 | Buckendale | 74—695 |
| 2,480,210 | 8/1949 | Avila | 74—695 |
| 2,730,914 | 1/1956 | Rockwell | 74—695 |
| 2,858,714 | 11/1958 | Black | 74—695 X |
| 2,882,752 | 4/1959 | Russell | 74—695 |
| 3,195,371 | 7/1965 | Christie | 74—695 |

ARTHUR T. McKEON, *Primary Examiner.*